(12) United States Patent
Heinz

(10) Patent No.: US 6,247,180 B1
(45) Date of Patent: Jun. 19, 2001

(54) WEATHER-PROTECTING DISPLAY BANNER FOR HEADGEAR CROSS-REFERENCE TO RELATED APPLICATIONS

(76) Inventor: Richard Gordon Heinz, 4630 Santa Cruz Ave., San Diego, CA (US) 92107

( * ) Notice: Subject to any disclaimer, the term of this patent is extended or adjusted under 35 U.S.C. 154(b) by 0 days.

(21) Appl. No.: 09/588,009

(22) Filed: Jun. 6, 2000

Related U.S. Application Data

(60) Provisional application No. 60/135,855, filed on May 25, 1999.

(51) Int. Cl.⁷ ................................. A42B 1/22; A42B 1/04
(52) U.S. Cl. ................................. 2/171; 2/209.13; 2/207; 351/155
(58) Field of Search ................................. 2/171, DIG. 11, 2/207, 9, 174, 10, 202, 203, 208, 206, 209.13; 351/155, 157

(56) References Cited

U.S. PATENT DOCUMENTS

| | | | |
|---|---|---|---|
| 4,937,885 | * 7/1990 | Gregg | 2/209.11 |
| 5,046,195 | * 9/1991 | Koritan | 2/171 |
| 5,048,128 | * 9/1991 | Watson, Jr. | 2/204 |
| 5,161,260 | * 11/1992 | Reynolds | 2/207 |
| 5,400,440 | * 3/1995 | Clifford | 2/172 |
| 5,694,647 | 12/1997 | Crickmore | |
| 5,906,006 | * 5/1999 | Castro, Jr. | 2/207 |
| 5,918,316 | 7/1999 | Nathanson | |
| 5,930,842 | * 8/1999 | Burruss | 2/209 |
| 6,014,776 | 1/2000 | DeVinzio | |
| 6,032,292 | * 3/2000 | Wood et al. | 2/207 |
| 6,047,401 | * 4/2000 | Traumer | 2/10 |

\* cited by examiner

Primary Examiner—Gloria M. Hale
(74) Attorney, Agent, or Firm—Thomas J. Tighe, Esq.; Howard C. Tarr, Esq.

(57) ABSTRACT

A display banner that may be attached to headgear and adjusted to provide weather protection for the back of the head, neck, ears and portions of the back and shoulders. It may allow the top of the wearer's head and hairstyle to remain uncovered, well ventilated and well groomed. Its shape and insertable supports enhance its inherent potential area for displaying promotional material and/or the preferred art of the wearer.

8 Claims, 5 Drawing Sheets

WEATHER-PROTECTING DISPLAY BANNER FOR HEADGEAR CROSS-REFERENCE TO RELATED APPLICATIONS

CROSS-REFERENCE TO RELATED APPLICATIONS:

This application is entitled to the benefit of Provisional Patent Application Ser. No. 60/135,855 filed May 25, 1999.

BACKGROUND--FIELD OF INVENTION

This invention relates to headgear accessories, specifically those that serve to display promotional material and or art while providing weather protection to the wearer.

BACKGROUND--DESCRIPTION OF PRIOR ART

From long ago to recent times adaptations of headgear such as turbans, bandannas, scarves and hats served to provide the wearer's head area with a degree of protection from the weather. Turbans, the Arabic kifayah and these types of headgear rely on a hat-like covering to support material which then shields the wearer from the weather. One drawback to these types of head-covering headgear is that they do not allow the top of the wearer's head access to open air or ventilation thus causing the head to perspire. This can cause discomfort and at the very least dishevel the wearer's hairstyle.

Bandannas and scarf-like headgear don't necessarily have to cover the top of the head. However, in order to provide weather protection to the back of the head, neck and ears they are worn folded and knotted about the head or face. To be worn in such a way makes them hopelessly undesirable, by most, as fashion garments.

None of the aforementioned headgear makes full use of their potential for displaying promotional material or art. This is largely due to the inherent folds in the material as it is deployed about the head and neck areas. These folds hide that which is printed on them making messages or art hard to view. This drawback lowers their potential benefit as advertising or display tools.

SUMMARY

The present invention is a unique display banner, attachable to headgear and may be worn from the back and sides of the wearer's head in a downward fashion. Its shape and insertable supports allow for maximum usage of its body portion for display and weather-shielding purposes.

Objects and advantages

Accordingly, several objects and advantages of the present invention are:

(a) to provide a headgear accessory the gives weather protection to the back of the head, neck and ear areas without needing to cover the top of the wearer's head.

(b) to provide a headgear accessory that does not need to cover the top of the head, thereby not causing the wearer's head to perspire or be uncomfortable.

(c) to provide a headgear accessory that does not need to cover the top of the head, thereby leaving the wearer's hairstyle unmolested and not disheveled.

(d) to provide a headgear accessory that need not be folded or knotted about the face to be worn.

(e) to provide a headgear accessory that is a fashionable and functional alternative to other types of headgear.

(f) to provide a headgear accessory that may use eyeglasses as an integral part of its functionality.

(g) to provide a headgear accessory capable of attaching to all headgear.

(h) to provide a headgear accessory capable of displaying its flexible body portions without the folds of material usually associated with headgear that deploy in the back of the head and neck area.

(i) to provide a headgear accessory capable of utilizing its full body portion as a display area for promotional material and/or the preferred art of the wearer.

(j) to provide a headgear accessory as a means of displaying advertisements and art in a novel, functional way so as to benefit various types of enterprise as an advertising tool.

Still further objects and advantages will become apparent from a consideration of the ensuing description and drawings.

DRAWING FIGURES

Figure 1:
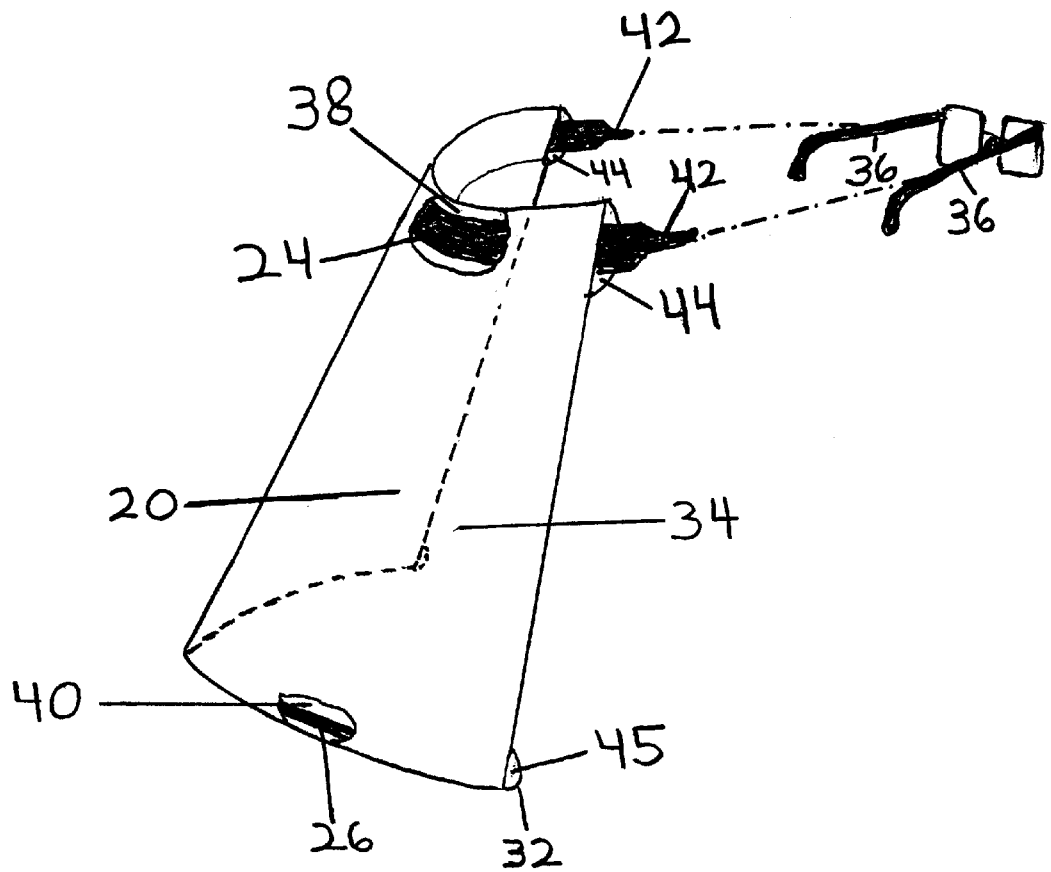
FIG. 1 is a perspective view of the present invention.

Reference Numerals in Drawings 20 body portion
22 sleeve facing
24 support and attaching device
26 flexible support insert
28 crescent-shaped top edge
30 hook and loop fastener
32 bottom edge sleeve
34 display area
36 eyeglass arms
38 cutaway view of the upper sleeve
40 cutaway view of the bottom sleeve
42 stretching tube connectors
44 upper sleeve openings
45 bottom sleeve openings
46 headband (inserted)
48 attachable headband
50 attachable hat

DESCRIPTION OF THE PREFERRED EMBODIMENTS

With reference to the drawings, FIG. 1 shows a preferred embodiment of the present invention. This view includes a body portion 20 shown facing the rear from the wearer. It is made from material such as, but not limited to, cotton, cotton blends, linens, polyester, etc. FIG. 1 includes a cutaway view 38 of a support and attaching device 24 which in this embodiment may be made of one inch wide and one-eighth inch thick neoprene strips. The ends of these strips are sewn separately so as to become two stretching tube connectors 42. These connectors are slid onto the eyeglass arms 36. This, in effect, forms a completed circle which may fit around the wearer's head. The support and attaching device 24 may be inserted or removed through the upper sleeve openings 44.

FIG. 1 also includes a cutaway view of the bottom sleeve 40. This reveals the flexible support insert 26 which may be inserted through the bottom sleeve openings 45.

Figure 2:
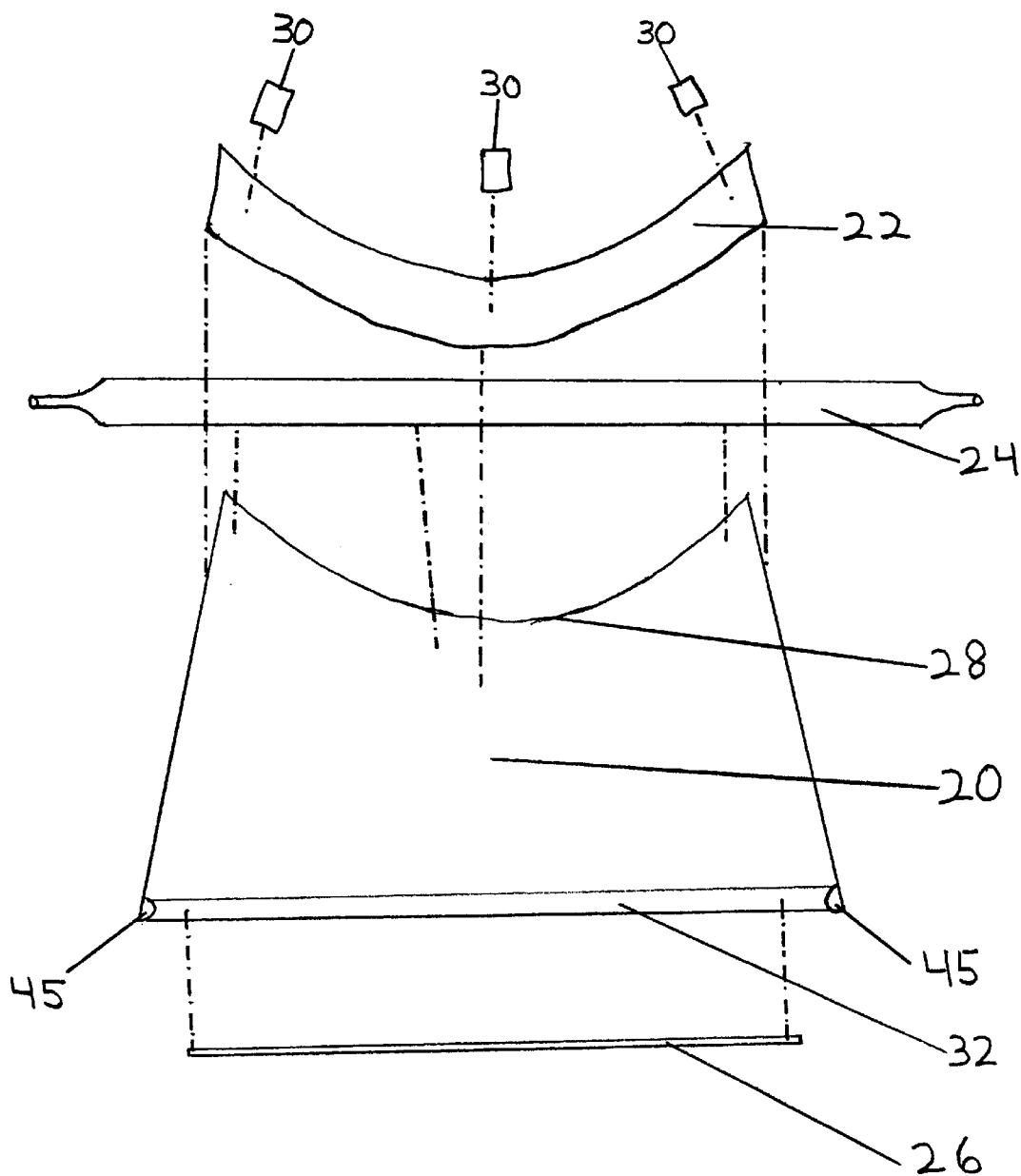
FIG. 2 is an exploded view of the invention looking at its inner surface as it faces the back of the wearer's head.

FIG. 2 shows a flat, exploded view of the present invention as it faces the wearer's head. This allows the reader to see the crescent-shaped top edge 28 of the body portion 20. This crescent-shaped top edge 28 may be sewn to a sleeve facing 22 forming an upper sleeve in which a support and attaching device 24 may be inserted. For use in other preferred embodiments, hook and loop fasteners 30, as well as other means of attachment, may be attached to the sleeve facing 22. FIG. 2 also includes a flexible support insert 26 made of thin plastic strip or other material. This may be inserted into the bottom sleeve by way of the bottom sleeve openings 45.

Figure 3:
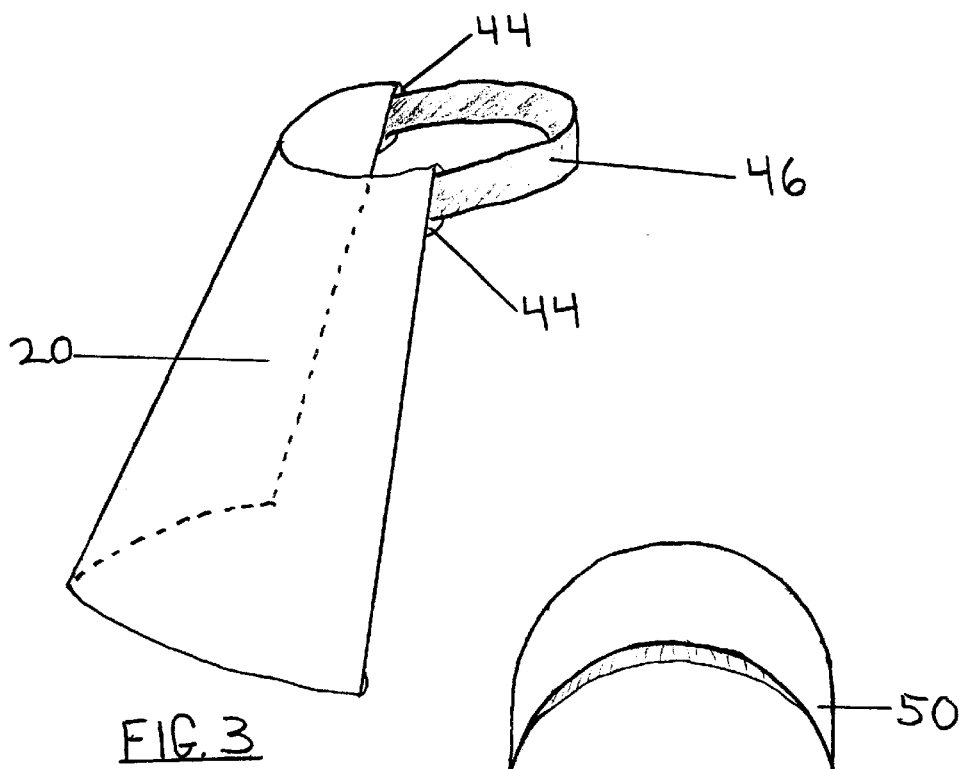
FIG. 3 is a perspective view of the present invention assembled with a headband through it.

FIG. 3 shows a perspective view of the present invention in another preferred embodiment using an inserted headband 46. This headband 46, in effect, replaces the eyeglasses and support and attaching device 24 of FIG. 1. The headband 46 is either manufactured into the present invention or is severed, inserted through the upper sleeve openings 44 and then reconnected to itself to form a completed headband once more.

Figure 4:
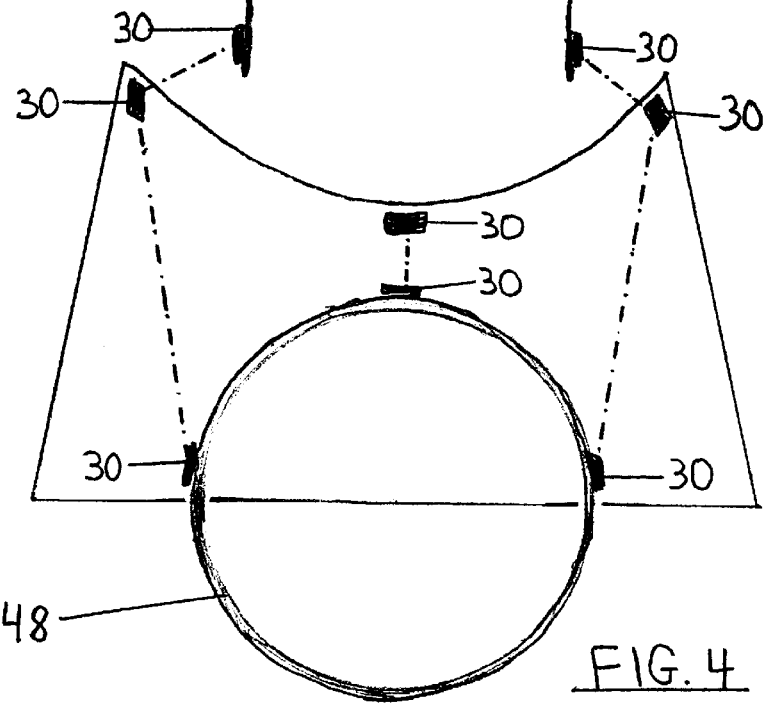
FIG. 4 is a flat view of the inner surface as it may be attached to other headgear.
Figure 5:
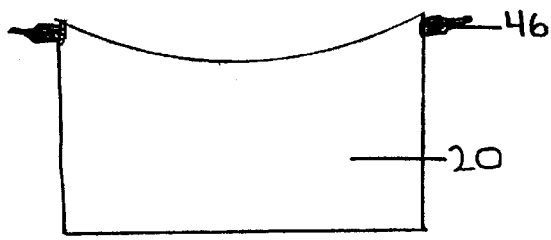
FIGS. 5 to 10 are flat views of alternative configurations as seen from the rear.
Figure 6:
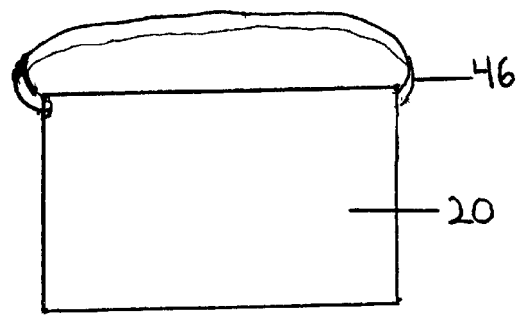
Figure 7:
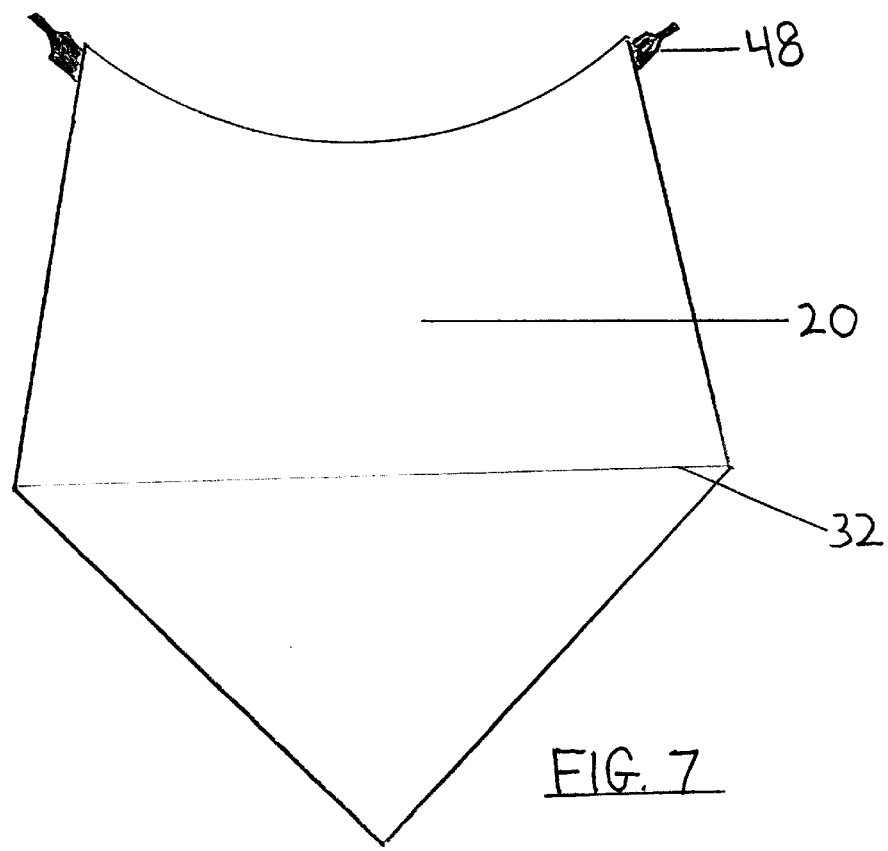
Figure 8:
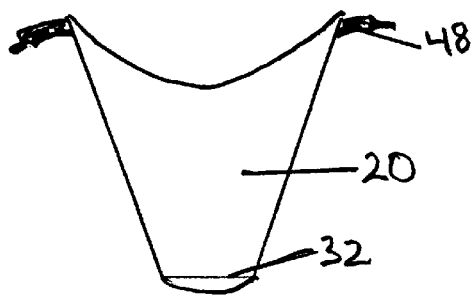
Figure 9:
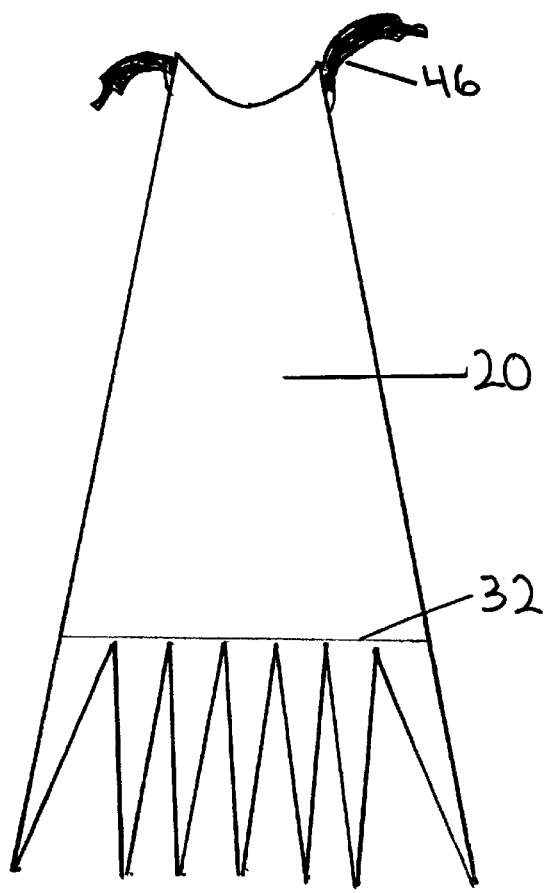
Figure 10:
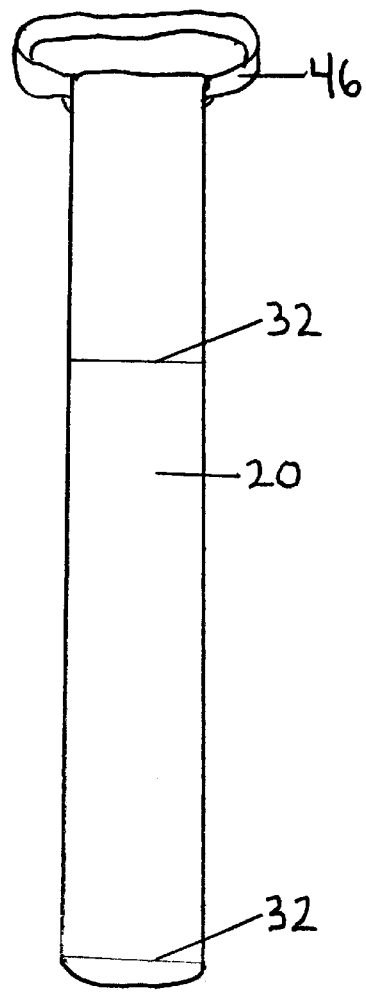

FIG. 4 shows a flat view of the inner surface of the body portion 20 and how it may be used with other types of separate headgear. This view shows an attachable headband 48 and an attachable visor 50 being attached by such means as, but not limited to, hook and loop fasteners 30 to the body portion 20. FIG. 4 shows an attachable headband 48 as seen from the top down and an attachable visor 50 as seen upright on its end. These angles allow the reader to see how these headgear and other types (hats, caps, etc.) may be attached to the body portion 20.

FIGS. 5 to 10 show other varied preferred embodiments. These have features previously described in the other figures and may be deployed in the same way.

Operation of the Invention

All previously described embodiments of the present invention may be worn about the back of the head, neck, ears and portions of the back and shoulder areas. The embodiment in FIG. 1 may be attached by way of two stretching tube connectors 42 to eyeglasses arms 36. The stretching tube connectors 42 and the support and attaching device 24 may be constructed of one continuous strip of neoprene where its ends may be sewn into tubes. These stretching tube connectors 42 may be pulled up the length of the eyeglass arms 36 so that the crescent-shaped top edge 28 may be slid along the support and attaching device 24. This may serve to cover the ears of the wearer and spread the material of the body portion 20. This, in turn, may aid in weather protection and increase the display area.

In FIG. 3 headband 46 is connected within the sleeve facing 22 of the invention and worn in its normal fashion. FIG. 4 shows headgear such as, but not limited to, attachable headband 48 and attachable visor 50. These types of headgear may be attached to the sleeve facing 22 by means such as hook and loop fasteners 30. This makes the invention able to be replaced quickly or transferred to a different type of headgear the wearer may prefer.

In order to spread the display area body portion 20 wider a flexible support insert 26 may be inserted into the bottom sleeve openings 45. All of the outer body portion 20 and some of the inner portion may be used for display or promotional purposes.

All embodiments are best fitted to the wearer by placing the assembled headgear on top of the head and sliding them from the top of the head down into the desired placement. When the top edge of the invention is in line with the eyeglass arms 36 or headband 46, etc., the body portion 20 display area is best viewed. FIGS. 5 to 10 show embodiments which may be made, be deployed and function as the embodiments in FIGS. 1, 3 and 4. All embodiments and shapes thereof may be deployed so as to provide weather protection and display area for promotional material and or the preferred art of the wearer.

CONCLUSION, RAMIFICATIONS AND SCOPE

Accordingly, the reader will see that this weather-protecting display banner for headgear not only provides weather-shielding to the back of the head, neck and ear areas while allowing the top of the head to remain uncovered, well ventilated and thus perspire less. It provides this protection while allowing the hairstyle of wearer to remain uncovered and well groomed. The present invention is ideal for people who wish to go out in the sun, have the back of their head, necks and ears protected without having to muss their hairstyle with a sweat inducing head covering.

The present invention successfully utilizes a hitherto badly used area for displaying promotional material or art. With its unique shape and insertable supports it maximizes its available display area. The invention is also quickly interchangeable. For example, within seconds it can be changed from an island scene being worn at a beach party to displaying a team's logo at a game. If soiled, while being worn by a small child or infant, the parent could quickly attach a clean one.

Where this invention may aid in advertisement and sales of various products, it may also be used to help protect people from effects of the sun. With the ongoing depletion of the ozone this is a concern shared by most.

This simple and effective invention is inexpensive, beneficial, highly reliable, fashionable, lightweight, novel, interchangeable, may be easily folded into a shirt pocket and may be worn anywhere by people of all ages.

While my above description contains many specificities, these should not be construed as limitations on the scope of the invention, but rather an exemplification of one preferred embodiment thereof. Many other variations are possible. For example, the body portion and display area could be made out of a cold pack, heat pack or, when technology permits, a flexible electronic screen for moving images. Thus, the scope of the invention should be determined not by the embodiments illustrated, but by the appended claims and their legal equivalents.

I claim:

1. A weather-protecting display banner for headgear, comprising:

(a) a body of flexible material;

(b) a first open-ended sleeve extending alone an upper margin of the body;

(c) a strip of material passing through both ends of said sleeve for attaching to eyeglasses enabling said weather-protecting display banner to be secured to a wearer;

(d) a second open-ended sleeve extending along a bottom margin of the body; and (e) a strip of semi-flexible material insertable into the second open-ended sleeve for straightening out folds of material in the body to expand a viewable surface area of the weather-protecting display banner.

2. Weather-protective headgear comprising:
 (a) a body of flexible material including a display area capable of bearing indicia for display;
 (b) an open-ended sleeve along an upper margin of the body; and
 (c) a support, extending through the upper margin sleeve and at least partially encircling a wearer's head, for draping the body from the head so that the display area is viewable by others, the draped body at least partially shielding the wearer from weather.

3. The headgear according to claim 2 wherein the support comprises:
 (a) a strip of material disposed in the upper margin sleeve; and
 (b) a connector, at each end of the strip, for attaching thereto respective eyeglass arms.

4. The headgear according to claim 3 wherein each connector comprises a stretchable tube slidable onto an eyeglass arm.

5. The headgear according to claim 2 wherein the support comprises a headband.

6. The headgear according to claim 2 further comprising:
 (a) a second open-ended sleeve along a bottom margin of the body; and
 (b) a strip of semi-flexible material insertable into the second open-ended sleeve for straightening out folds of material in the body to expand the display area.

7. Weather-protective headgear comprising:
 (a) a body of flexible material including a display area capable of bearing indicia for display;
 (b) a plurality of fastening devices along an upper margin of the body; and
 (c) a support, connectable to the body by the fastening devices and at least partially encircling a wearer's head, for draping the body from the head so that the display area is viewable by others, the draped body at least partially shielding the wearer from weather.

8. The headgear according to claim 7 further comprising:
 (a) a second open-ended sleeve along a bottom margin of the body; and
 (b) a strip of semi-flexible material insertable into the second open-ended sleeve for straightening out folds of material in the body to expand the display area.

\* \* \* \* \*